United States Patent [19]
Possati

[11] 3,975,829
[45] Aug. 24, 1976

[54] MEASURING DEVICE FOR MECHANICAL WORKPIECES
[75] Inventor: Mario Possati, Bologna, Italy
[73] Assignee: Finike Italiana Marposs-Soc. In Accomandita Semplice di Mario Possati & C., Bentivoglio, Italy
[22] Filed: Apr. 4, 1975
[21] Appl. No.: 565,194

Related U.S. Application Data
[63] Continuation of Ser. No. 500,008, Aug. 23, 1974, abandoned, which is a continuation of Ser. No. 273,817, July 21, 1972, abandoned.

[30] Foreign Application Priority Data
July 30, 1971  Italy.................................... 3488/71

[52] U.S. Cl............................ 33/169 R; 33/147 N; 33/172 E; 33/DIG. 6; 33/DIG. 17
[51] Int. Cl.²......................................... G01B 5/16
[58] Field of Search........... 33/172 E, 172 R, 147 L, 33/147 N, DIG. 17, 169 R, DIG. 6; 269/297–301; 193/26; 108/137, 143; 198/204

[56] References Cited
UNITED STATES PATENTS
| 565,723 | 8/1896 | Chalmers | 33/172 R |
|---|---|---|---|
| 1,176,228 | 3/1916 | McIntosh | 198/204 |
| 2,867,043 | 1/1959 | Jarret et al. | 33/172 E |
| 2,913,829 | 11/1959 | Arlin | 33/172 E |
| 3,088,591 | 5/1963 | Perthen et al. | 33/147 L |
| 3,168,196 | 2/1965 | Harder | 33/172 E |
| 3,193,937 | 7/1965 | Aller | 33/172 E |
| 3,618,762 | 11/1971 | Sklar | 33/172 E |

FOREIGN PATENTS OR APPLICATIONS
| 401,503 | 5/1966 | Switzerland | 33/DIG. 17 |
|---|---|---|---|
| 447,235 | 5/1936 | United Kingdom | 108/137 |

Primary Examiner—Richard E. Aegerter
Assistant Examiner—John W. Shepperd
Attorney, Agent, or Firm—Stevens, Davis, Miller & Mosher

[57]     ABSTRACT

A dimension measuring device for mechanical workpieces at the exit of a machine tool, comprising collection and guide means for the workpieces at the exit of the machine, and a measuring member disposed on the collection and guide means for measuring each of the workpieces as it passes the member; the measuring member itself comprises a contact element, resilient means for thrusting the contact element against the workpiece to be measured and power dissipation means connected to the contact element for making the contact element follow the profile of the workpiece which passes and for preventing the contact element from rebounding in consequence of the impacts of the workpieces.

2 Claims, 2 Drawing Figures

MEASURING DEVICE FOR MECHANICAL WORKPIECES

This is a continuation of application Ser. No. 500,008 filed Aug. 23, 1974, now abandoned which application is a continuation of Ser. No. 273,817 filed July 21, 1972, now abandoned.

The present invention relates to a dimension measuring device for mechanical workpieces at the exit of a machine tool.

The device is particularly intended for the measurement of workpieces at the exit of those machines in which it is normally impossible to check the workpieces during machining.

Generally at the exit of these machines a bench check is made on a random sample of these workpieces. A complete and ordered check is normally impossible because of the high number of pieces machined by the machine. The control and correction of the machine are consequently extremely unreliable, and a grading of the workpieces is quite impossible.

The technical problem which the present invention aims to solve is that of providing a device which allows the exact measurement of each individual workpiece in such a manner as to be able to effect both the control of the machine and the grading of the workpieces.

This problem is resolved by the measuring device according to the invention which comprises collection and guide means for the workpieces at the exit of the machine, and a measuring member arranged on the collection and guide means, the measuring member being adapted to check each of the workpieces as it passes the measuring member.

The following description illustrates a preferred embodiment of the invention given by way of a non-limiting example with reference to the accompanying drawings in which.

Figure 1:
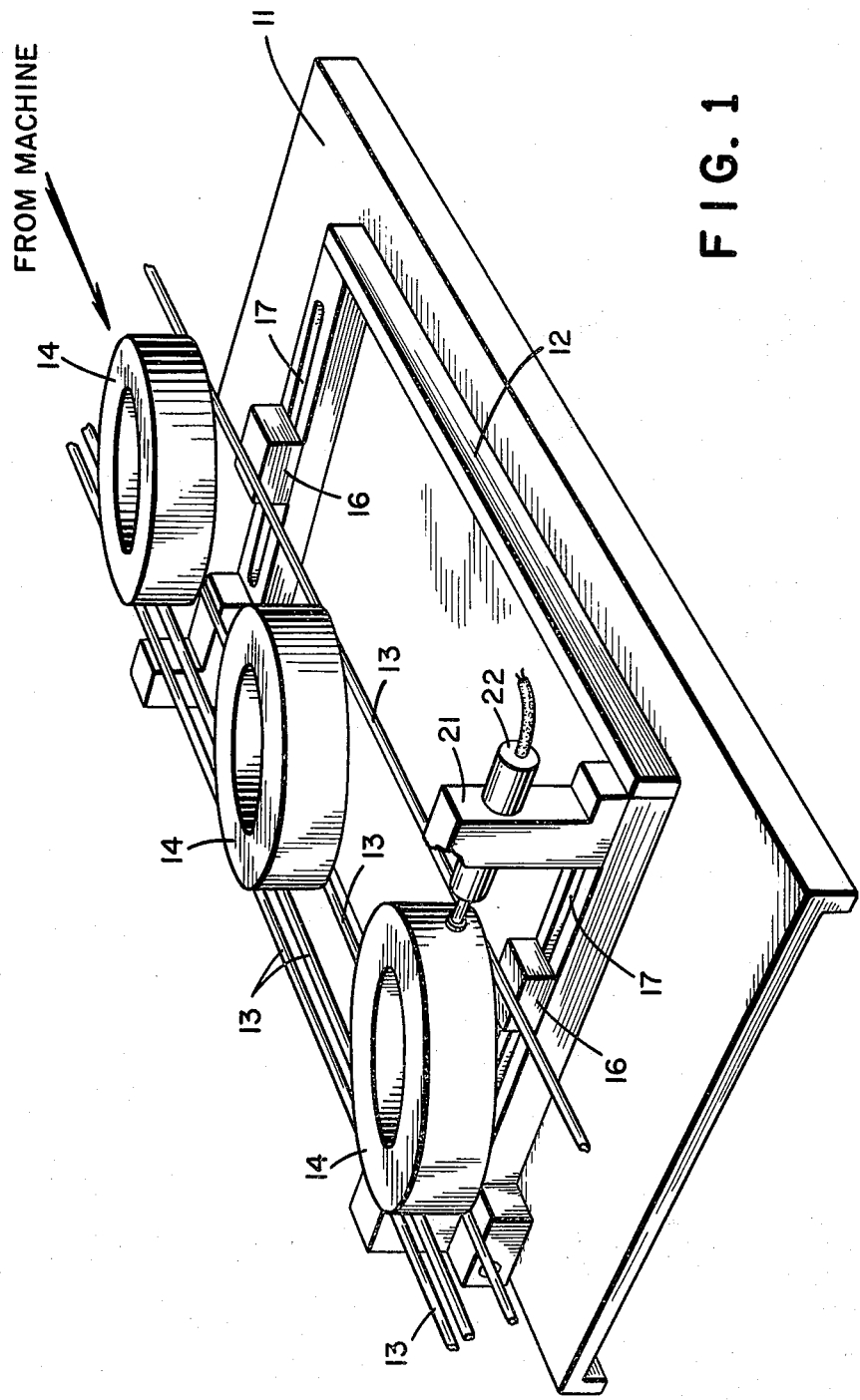
FIG. 1 is a perspective view of the device according to the invention.

The following description is made particularly in connection with a checking of bearing rings at the exit of a centerless grinding machine. The device comprises a support plate 11 which is fixed to the machine in any known manner. On the plate 11 is arranged a frame 12 on which are fixed collecting and guiding bars 13 for receiving the rings 14 which leave the machine after machining and for guiding the rings along the bars. One of the bars 13 is fixed on two supports 16 which are transversely mobile on two guides 17 of the frame 12 so as to adapt its position to the different sizes of rings 14. On the frame 12 is fixed a support 21 in which a measuring head 22 is suitably provided. The rings 14 leaving the machine pass the measuring head 22 which is adapted to measure their diameter.

Figure 2:
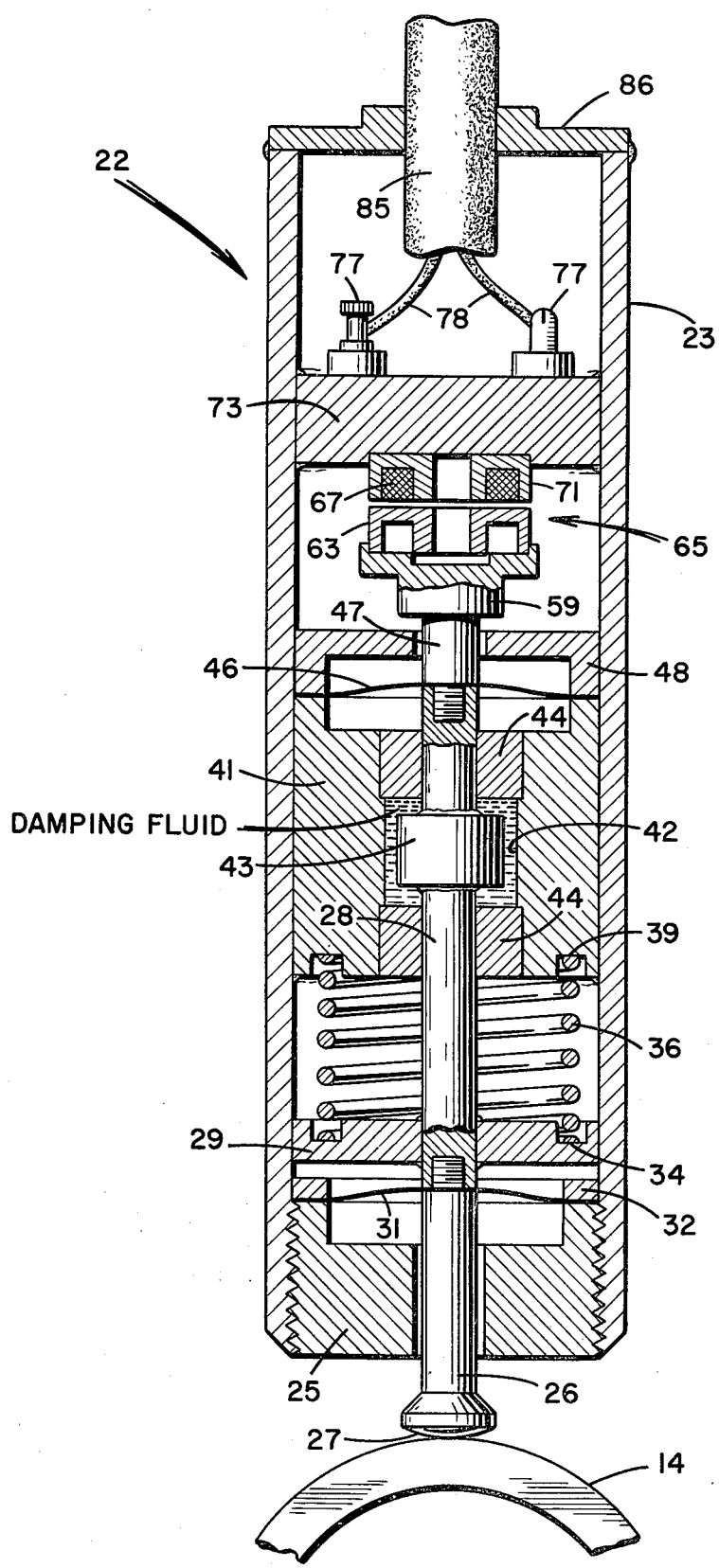
FIG. 2 is a partly cross-sectional enlarged view of a measuring member of the device according to the invention.

With reference to FIG. 2, the measuring head 22 comprises a casing 23 closed at its front by a flange 25 screwed on to the casing. From the flange 25 emerges a finger 26 constituting the element which comes into contact with the ring 14 to be measured.

The finger 26 terminates in a curved surface 27 suitably designed so as to optimize its adaptation to the ring 14 to be checked, and is screwed on to a shaft 28. Between the shaft 28 and finger 26 is arranged a circular spring 31 locked against the flange 25 by a ring 32.

On the shaft 28 is fixed a disc 29 provided with a seat 34 housing a spring 36 adapted to thrust the finger 26 forwards against the rings 14. The spring 36 seats at its other end in a seat 39 formed in a body 41 fixed to the casing 23. In the body 41 is formed a cylindrical cavity 42 in which a piston 43 fixed on to the shaft 28 may slide.

The cavity 42 is filled with oil of a suitable density and is closed by two sealing bushes 44 fixed to the body 41. The movement of the piston 43, and hence of the shaft 28 and finger 26, is thus dampened by the resistance offered by the shearing of the oil.

On the shaft 28 is also fixed a second circular spring 46 locked against it by a shaft 47 screwed on to the shaft 28. The spring 46 is also locked against the body 41 by a ring 48. The two circular springs 31 and 46 provide for the centering of the shaft 28 so that it may slide without friction. To the upper end of the shaft 47 is fixed a support 59 for supporting a support frame or armature 63 of a transducer 65. The transducer 65 is a positional transducer, for instance, of the inductive type, with its windings 67 arranged on a second armature 71 fixed to a support 73, which is in turn connected to the casing 23.

To the support 73 are also fixed two sockets 77 for cables 78 which pick up and feed the signal supplied by the transducer 65. The cables 78 are carried in a sleeve 85 fixed to a closure plate 86 for the casing 23.

The device operates in the following manner.

When the device is at rest the spring 36 thrusts the finger 26 downwards until the support 59 comes into contact with the ring 48 which limits the downward movement or stroke of the shaft 28. When working, the finger 26 is periodically subjected to the stresses caused by the workpieces to be checked which pass at a certain speed under the measuring device. At each passage the finger 26 is thrust upward against the force of the spring 36 and damper 43. In particular, the damper is designed in such a way as to prevent the finger 26 from rebounding against the workpiece to be measured 14.

The finger 26 thus follows exactly the profile of the ring 14 to be measured, through which by electronic measurement of the maximum value provided by the transducer 65 the diameter of the ring is obtained.

The spring 36 and damper are also designed so as to enable the finger 26 to return to the rest position sufficiently quickly to be able to measure all the rings 14 which pass in rapid succession in front of the measuring head 22.

It is understood that this device is able to receive the rings 14 and feed them, in the order in which they have been machined, towards the measuring head 22. Having measured the dimensions of these rings it is possible to control the machine correctly and carry out a grading of the rings.

What is claimed is:

1. A dimension measuring device for measuring the dimensions of workpieces subsequently leaving the exit of a centerless grinding machine in order to control the machine, comprising:
   a frame;
   support means carried by the frame, the support means including supports fixed on the frame;
   collecting and guiding bars fixed on said supports adapted for receiving workpieces leaving a grinding machine and for directly guiding them in succession, in the order in which they have been machined, along the bars; and a measuring head fixed to said frame in a side position of said bars, the measuring head including:

a casing;

a shaft axially movable in said casing towards and away from the workpieces passing along the bars;

a finger fixed at an end of said shaft, for contacting the workpieces to be measured;

resilient means arranged in said casing and coupled to said shaft for thrusting said finger against the workpieces passing past the measuring head;

an hydraulic damper for making said finger follow the profile of each workpiece passing past the measuring head, said hydraulic damper comprising a piston coupled to and coaxial with said shaft, a cylinder coupled to said casing, and a fluid contained in said cylinder for dampening the movement of the piston in the cylinder; and a position transducer including a first member fixed to said shaft, a support member fixed to said casing, a second member fixed to said support member, socket and cable means fixed to said support means and connected to said second member adapted to provide a dimension measurement signal depending on the shaft position;

whereby all of the workpieces leaving the grinding machine are measured while passing in succession, guided by said bars past the measuring head.

2. The measuring device as claimed in claim 1, in which at least two of said supports are adjustably fixed on the frame to be adjustable in a transversal direction thereof and in which at least one of said guide bars is fixed to said adjustable supports to adapt the collecting and guiding means to different dimensions of the workpieces to be measured.

* * * * *